United States Patent [19]

Alaimo

[11] 3,718,289

[45] Feb. 27, 1973

[54] REEL SERVO SYSTEM

[75] Inventor: Benjamin Alaimo, Camarillo, Calif.

[73] Assignee: Peripheral Equipment Corporation, Chatsworth, Calif.

[22] Filed: March 5, 1971

[21] Appl. No.: 121,323

[52] U.S. Cl. ..............................242/190, 242/75.51

[51] Int. Cl. .......B65h 59/38, B65h 63/02, G03b 1/04

[58] Field of Search........242/182, 191, 75.44, 75.51, 242/206; 318/6, 7; 310/95

[56] References Cited

UNITED STATES PATENTS

| | | | |
|---|---|---|---|
| 3,319,901 | 5/1967 | Kurth | 242/186 |
| 3,324,320 | 6/1967 | Evert | 310/95 |
| 3,606,198 | 9/1971 | Gilbreath et al. | 242/186 |
| 3,318,546 | 5/1967 | Bejach | 242/190 |

*Primary Examiner*—Leonard D. Christian
*Attorney*—Lindenberg, Freilich & Wasserman

[57] ABSTRACT

A system useful in magnetic tape transports for controlling a reel drive motor so as to provide steady tension on the tape. Magnetic tape transports generally utilize three separate motors to respectively drive the capstan and two reels. A separate servo system is usually provided for controlling the angular speed of each of the drive motors. In the case of a reel servo system, the system controls the angular speed of a reel drive motor to maintain steady tape tension in spite of (1) rapid changes in linear tape speed; e.g., start-stop operations and (2) slowly occurring changes in reel radius. A tape reservoir is formed by a spring urged tension arm which bears against the tape between the capstan and reel. The tension arm makes rapid positional changes in response to rapid tape speed changes to isolate the reel inertia from the capstan, for example, on starting. This positional change of the tension arm provides time for the reel to come up to speed and pay tape out at the tape speed established by the capstan. The tension arm makes gradual positional changes in response to variation in radius of the tape quantity on the reel. In accordance with the invention, a first electrical signal, produced in response to tension arm position, together with a second electrical signal indicative of capstan speed, is used to control the angular speed of the reel drive motor. The major portion of the range of possible tension arm position change is dedicated to allowing for rapid changes required in reel angular speed as a consequence of changes in capstan speed and a considerably smaller portion of this range is dedicated to changing reel angular speed in response to changes in tape quantity radius.

10 Claims, 10 Drawing Figures

INVENTOR.
BENJAMIN ALAIMO
BY Lindenberg, Freilich & Wasserman
ATTORNEYS

INVENTOR.

BY BENJAMIN ALAIMO

Lindenberg, Freilich & Wasserman

ATTORNEYS

*INVENTOR.*
BENJAMIN ALAIMO

*BY*

ATTORNEYS

INVENTOR.
BENJAMIN ALAIMO
BY
Lindenberg, Freilich & Wasserman
ATTORNEYS

REEL SERVO SYSTEM

BACKGROUND OF THE INVENTION

1. Field of the Invention

This invention relates generally to magnetic tape transport units and more particularly to a reel servo system for use in such units.

2. Description of the Prior Art

Magnetic tape transports are used extensively in data processing systems for storing great amounts of data. Typically, such transports utilize three separate motors to respectively drive the capstan and each of two separate reels. Each of the drive motors is usually contained within a separate servo loop which controls the motor speed.

The function of the reel servo loop is to control the angular speed of a reel drive motor to maintain constant tape tension despite changes in tape speed and reel radius of the tape quantity on the reel. The typical transport includes means, e.g., a tension arm, forming a tape reservoir or loop between the reel and the capstan. The loop and tension arm form part of the reel servo system and function to enable constant tape tension to be maintained when rapid changes in reel motor speed are required. For example, on starting, the command is given to the capstan to pull the tape from the supply reel. Since it takes a finite interval for the reel motor to reach a speed at which it pays out tape at the same speed the tape is pulled by the capstan, the tape loop must surrender a sufficient supply of tape during this interval to maintain tape tension substantially constant. The amount of tape in the loop determines the position of the tension arm which in turn produces an electrical signal indicative thereof. This electrical signal is employed in the servo loop to control reel motor speed. Reel motor speed must also be varied as the radius of the tape on the supply reel varies.. That is, the radius ratio from full to empty reel is normally two to one thus requiring a two to one change in motor angular speed.

It can be shown that in typical prior art transport systems, the torque or motor current required is inversely proportional to tension arm movement. In order to reduce torque requirements, most prior art systems permit a large arm movement to thus reduce the motor current required. Typically, prior art systems produce changes in motor voltage, i.e., in motor speed, as the same function of tension arm position change regardless of whether the position change is attributable to (1) a change in capstan speed; e.g., start-stop operation or (2) a change in tape quantity radius. This approach of linearly relating tension arm movement to motor speed change dictates that the reel must be accelerated from rest to a full reel speed in one-half of the tension arm range of movement with the second half of the range being used to generate the signal for doubling reel speed as the tape quantity radius decreases toward minimum. For example, only, if a system were designed which required the reel motor, for a full reel, to accelerate up to a speed $S_1$ within one inch of tension arm movement, then a 2 inch tension arm range of movement would have to be permitted to allow reel motor speed to increase to $2S_1$ in order for the system to be operative to an empty reel condition.

SUMMARY OF THE INVENTION

In accordance with the present invention, the two aforementioned functions of the reel servo system are treated separately to reduce torque requirements. That is, instead of linearly relating motor speed to tension arm position, the servo system in accordance with the present invention defines a first function relating motor speed to tension arm position for a changing capstan speed and a second different function relating motor speed to tension arm position for a constant capstan speed but changing tape quantity radius. This approach enables the major portion of the tension arm position range to be dedicated to changing reel motor speed in response to a changing capstan speed, e.g., on starting. Thus, for example, for a two inch range of arm movement in one direction, 95 percent or 1.9 inches can be employed to execute the first function to thus reduce motor current requirements as contrasted with prior art systems in which only 50 percent of the two inch range would be available.

In a preferred embodiment of the invention, the reel motordrive amplifier is responsive to the difference between a first signal produced by the tension arm position and a second signal representative of the capstan speed. For example, the second signal can constitute the drive signal applied to the capstan drive motor or the output of a capstan tachometer. As a consequence of utilizing the difference between these two signals to drive the reel drive motor, on start-up, during the capstan acceleration period, a large movement of the tension arm (e.g., 95 percent of range) is permitted while the reel motor is accelerating from rest to the full reel speed $S_1$. Acceleration of the reel motor from the speed $S_1$ to the empty reel speed $2S_1$, occurring during a period of constant capstan speed, requires a considerably smaller amount of arm movement (e.g., 5 percent of range).

Thus, torque requirements are reduced for a system in accordance with the present invention as contrasted with prior art systems having the same range of arm movement. Alternatively, systems in accordance with the present invention having the same torque requirements as prior art systems can operate with a smaller range of tension arm movement.

Figure 1:
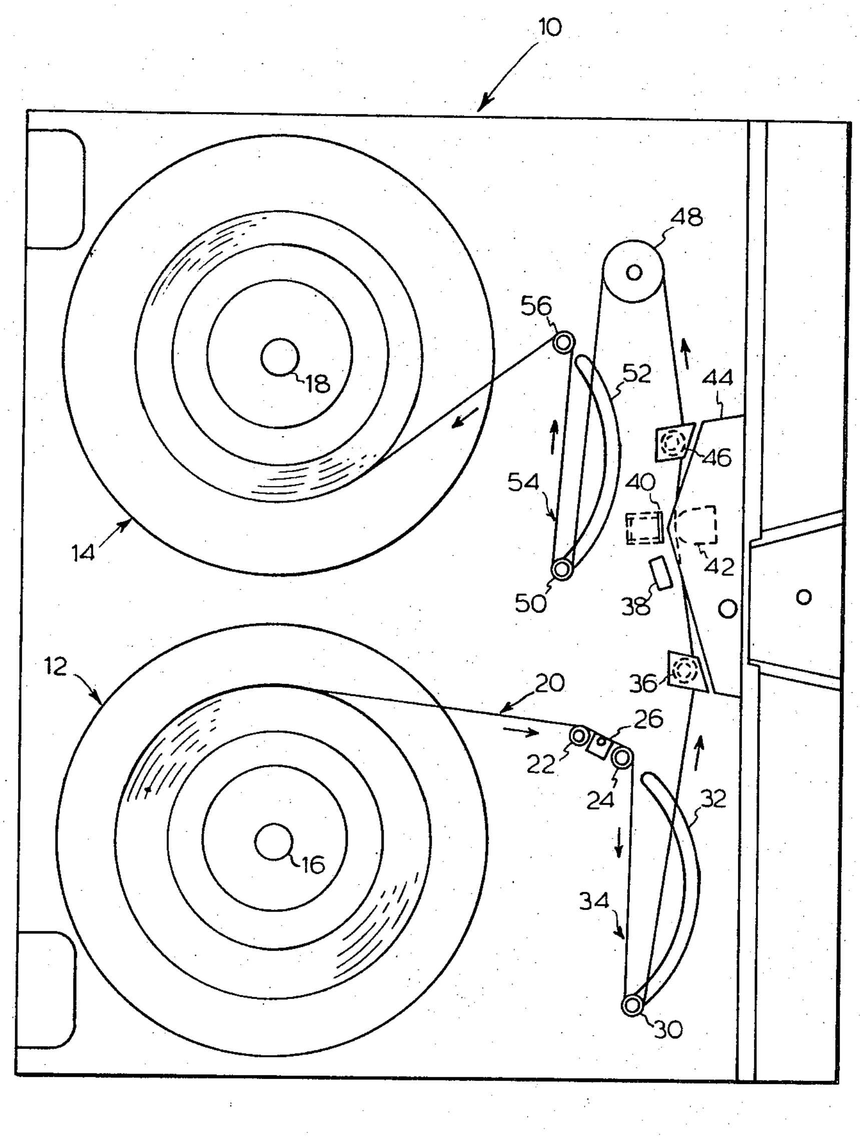
FIG. 1 is a front view of a typical tape transport which can advantageously employ the teachings of the present invention.

Attention is now called to FIG. 1 of the drawing which illustrates a typical magnetic tape transport 10 which can advantageously employ the teachings of the present invention. The tape transport 10 is illustrated as including a first supply reel 12 and a second take-up reel 14. The reels 12 and 14 are respectively removably secured to hubs 16 and 18 by suitable means well known in the art. Typically, the reel hubs 16 and 18 are rotatably driven by separate drive motors (not shown) each contained within a separate reel servo systems. As will be discussed in detail hereinafter, the present invention is directed to an improved reel servo system.

The tape transport 10 includes a plurality of elements between the supply reel 12 and take-up reel 14 for guiding tape along a defined path and for maintaining proper tape tension. More particularly, progressing from the supply reel 12, the tape 20 engages and extends around a pair of guide rollers 22 and 24 for passing the tape over a tape cleaning head 26. From the guide roller 24, the tape passes around the end of a tension arm 30 forming part of a tape reservoir. The function and operation of the tension arm and tape reservoir will be discussed in greater detail hereinafter. Suffice it is to say at this point that the tension arm 30 is movable along an arcuate path defined by slot 32. Spring means (not shown in FIG. 1) are provided for normally urging the tension arm 30 to an extreme end of the slot 32 to form a tape loop 34 of a maximum length.

After engaging the tension arm 30, the tape 20 passes around the guide capstan 36 and then past a sensor 38 which functions, for example, to photoelectrically sense a reflective tab on the end of the tape. Thereafter, the tape 20 passes between a flux gate 40 and a magnetic head 42, mounted between a head cover 44.

Subsequent to passing the head 42, the tape extends around a second guide capstan 46 and then around the drive capstan 48. As will be discussed hereinafter, the drive capstan 48 is typically rotatably driven by a separate drive motor (not shown in FIG. 1). The capstan drive motor is normally contained within a separate servo system. The capstan 48 frictionally engages the tape 20 to transfer the tape between reels. That is, in order to drive the tape in a forward direction from the supply reel 12 to the take-up reel 14, an electrical command signal is normally provided to the capstan drive motor which starts the tape 20 moving in the forward direction. The supply and take-up reel drive motors are independently energized to rotate the reels at appropriate speeds to respectively pay out and take in tape at the same linear tape rate established by the drive capstan.

Subsequent to passing over the drive capstan 48, the tape 20 passes around a tension arm 50 forming part of a second tape reservoir. The tension arm 50 is movable along path defined by arcuate slot 52. Spring means (not shown in FIG. 1) are provided for positioning the tension arm 50 at an extreme end of the slot 52 to form a tape loop 54 of maximum length. After passing around the tension arm 50, the tape 54 extends around a guide roller 56 prior to entering onto the take-up reel 14.

Figures 2A, 2B, 2C, 2D:
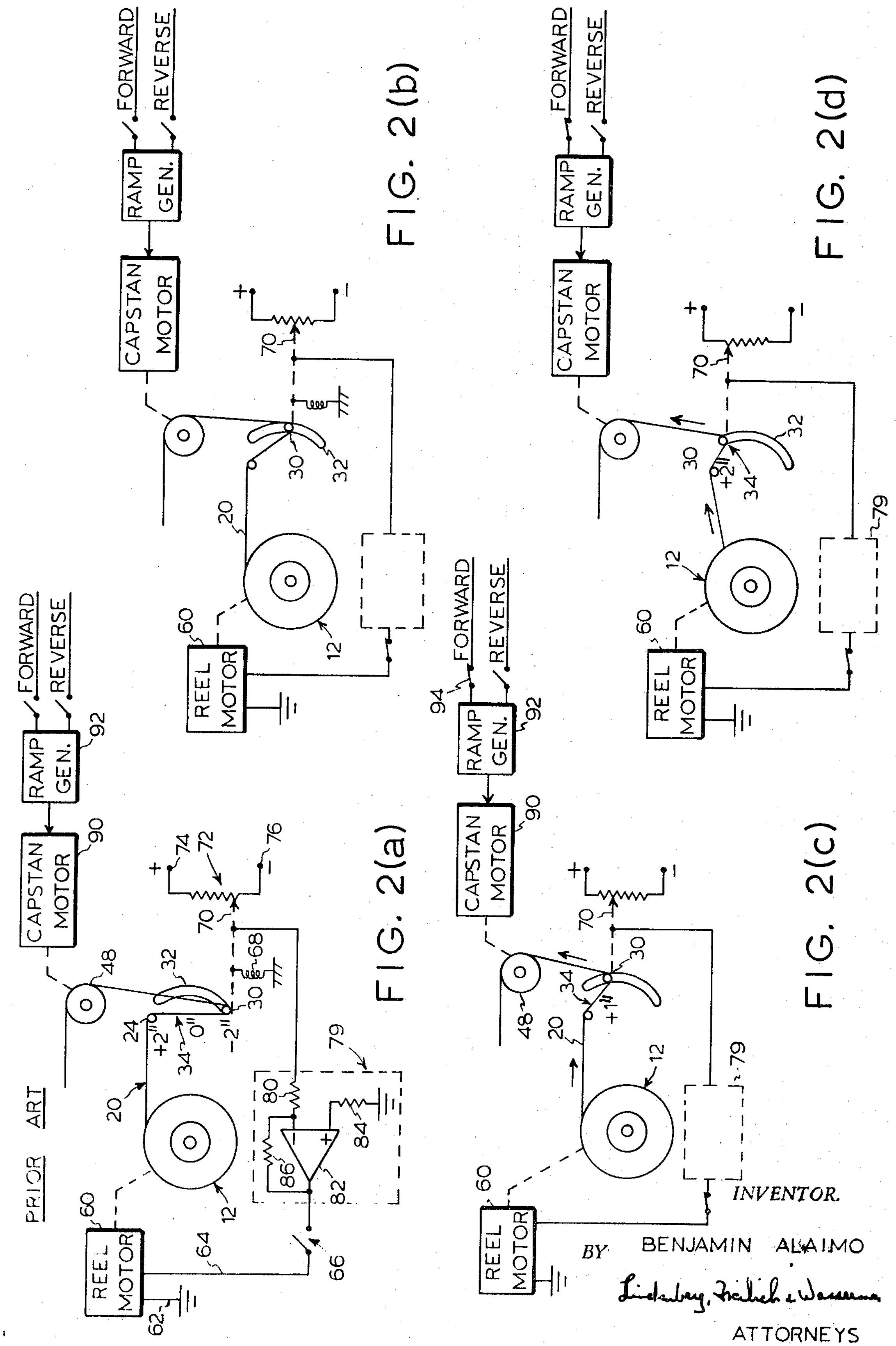
FIG. 2A is a schematic diagram of a typical prior art reel servo system in the power off condition.
FIG. 2B is a schematic diagram similar to FIG. 2A with power supplies to the reel drive motor but with the capstan at rest.
FIG. 2C is a schematic diagram similar to FIG. 2B with power on, the capstan moving at a constant speed, and with a full reel.
FIG. 2D is a schematic diagram similar to FIG. 2C except that it represents an empty reel condition.

Attention is now called to FIG. 2A which illustrates a typical prior art reel servo system of a type useful in the tape transport 10 of FIG. 1. Although the servo system for the supply reel 12 of FIG. 1 has been selected for illustration in FIG. 2A, it should be understood that the servo system involving the take-up reel 14 can be substantially identical. Prior to considering the servo system of FIG. 2A in detail, it is pointed out that a "-power off" condition is represented therein. FIGS. 2B–2D represent other conditions as will become more apparent hereinafter.

As shown in FIG. 2A, the supply reel 12 is driven by a reel motor 60. A first electrical terminal 62 of the motor 60 is illustrated as being electrically grounded. Motor torque or speed is controlled by a drive current voltage applied to the motor 60 through terminal 64. FIG. 2A illustrates a switch 66 connected in series with the terminal 64 representing the power on and off condition. The switch is illustrated as being open in FIG. 2A to represent the power off condition meaning that the motor 60 is energized.

A full tape reel has been assumed in FIG. 2A. Typically, a full reel of tape will have a 5 inch radius and an empty reel will have a 2½ inch radius. This means that in order for the reel 12 to pay out tape at the same linear rate for an empty reel condition as for a full reel condition, the reel 12 must exhibit twice the angular speed when empty as when full.

As shown, the tape from the reel 12 extends around a guide roller 24 and around the tension arm 30 to form a tape loop 34. Subsequent to the tension arm 30, the tape passes around the drive capstan 48. It will be appreciated that many of the elements illustrated in FIG. 1 between the drive capstan 48 and tension arm 30 have been deleted from FIG. 2A for the sake of simplicity.

A spring 68 is coupled to the tension arm 30 and acts in a direction to pull it to the bottom of arcuate slot 32. The tension arm 30 is operatively coupled to a slide contact 70 of a voltage divider 72. A direct current voltage may be connected across the divider 72; for example, terminal 74 may be connected to a positive voltage source and terminal 76 to a negative voltage source.

The slide contact 70 is electrically connected through a resistor 80 to one input terminal of an operational amplifier 82. The second amplifier input terminal is connected through resistor 84 to an electrical ground. A feedback resistor 86 couples the amplifier output terminal back to the first input terminal. The output of amplifier 82 is connected to the switch 66.

As was previously pointed out the drive capstan 48 is driven by a separate drive motor 90. The drive motor 90 is controlled by a drive signal applied thereto by ramp generator 92 which can be energized by either a forward or reverse command to generate either a positive or negative going signal.

With switch 66 open as shown in FIG. 2A, the reel motor 60 is of course unenergized and therefore couples no torque to the reel 12. Thus, the spring 68 acting on the tension arm 30 pulls the arm 30 to the bottom of the arcuate slot 32. When exemplary switch 66 is closed to apply power to the reel motor 60, it will rotate the reel 12 in a direction to substantially center the tension arm 30 within the slot 32. That is, as soon as the switch 66 is closed, (see FIG. 2B), the negative potential coupled to slide contact 70 from voltage divider terminal 76 will produce a signal at the output of amplifier 82 to energize the reel motor 60 to apply a counterclockwise torque to the reel 12. This will pull the tape 20 in a direction to reduce the tape length of the reservoir or loop to thereby move the tension arm 30 upwardly within the slot 32. This action, of course, will move the slide contact 70 upwardly on the voltage divider thereby reducing the driving current to the reel motor 60. Tape transports are typically designed so that with the power on and the tape at rest, the tension arm 30 will be substantially centered in its range of movement so as to be capable of either increasing or decreasing the amount of tape in the reservoir depending on whether the tape is to be moved in a forward or reverse direction.

Figure 3:
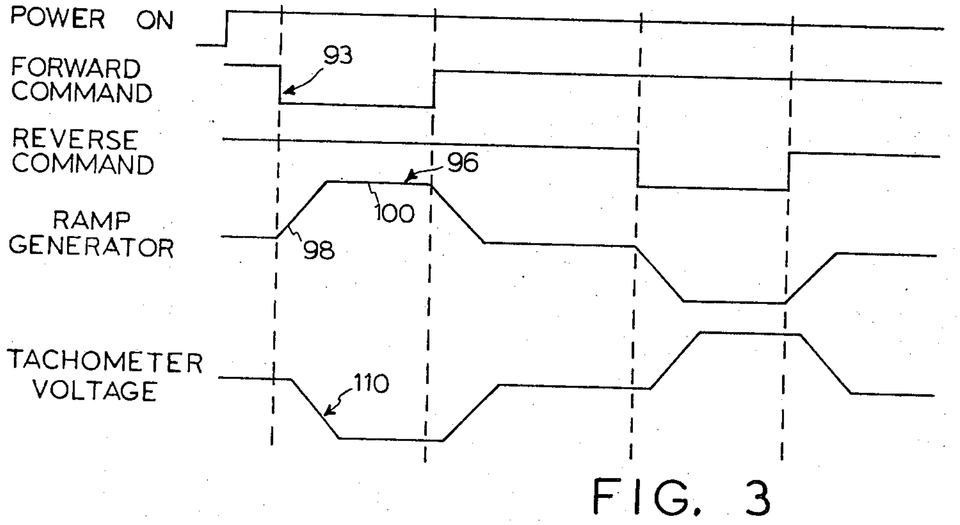
FIG. 3 is a waveform diagram illustrating signals typically occurring in the capstan servo of the system of FIG. 2.

Now assume, as shown in FIG. 2C, that a forward command signal 93 (FIG. 3) is applied to the ramp generator 92 as represented by the closure of switch 94 (FIG. 2C). The ramp generator will provide the signal represented in FIG. 3 to the capstan motor 90 to thereby rotate the drive capstan 48. Note that ramp generator output signal 96 in FIG. 3 consists of a ramp portion 98 during which the capstan motor will be accelerating and a level portion 100 during which the capstan motor will be rotating at its normal forward speed. As the drive capstan 48 pulls the tape 20 upwardly as shown in FIG. 2C, the length of tape within the tape loop 34 will of course be reduced (since initially the reel motor 60 is not rotating) to thereby pull the slide contact 70 upwardly on the voltage divider 72. As a consequence, the slide contact 70 will begin to see an increasing positive potential which will be applied to the operational amplifier network 79 to thereby produce a drive current for application to the reel motor 60 to rotate the reel 12 in a clockwise direction. The reduction of tape within the tape loop will continue until the speed of the reel 12 increases to a point at which tape is being paid out at the same speed at which it is being pulled by the drive capstan 48.

Thus, from the explanation of FIG. 2C, it should now be understood that the tape reservoir i.e., the tension arm 30 and associated elements, functions to isolate the inertia of the reel 12 from the drive capstan 48 and to provide an interval of time during which the reel 12 can come up to speed while tape is being provided to the capstan 48 by the tape reservoir.

It has previously been mentioned that the ratio between the tape radius of a full reel and an empty reel is typically two to one. This means that for an empty reel, the reel must be driven at an angular speed equal to twice the full reel speed. In other words, as tape is depleted from the supply reel 12, thus reducing the tape radius, it is essential that the reel 12 be rotated faster by the motor 60 in order to assure that tape is paid out sufficiently fast to maintain a constant tension on the tape. This function is performed by the reel servo system and is represented in FIG. 2D. That is, as the radius of the tape on the reel 12 decreases, the tape will tend to be paid out more slowly thereby reducing the length of tape within the loop 34. This in turn of course causes the arm 30 to move up within the slot 32. This in turn has the effect of moving the slide contact 70 up on the voltage divider 72 to thereby increase the positive voltage applied to the operational amplifier network 79 to thereby increase the drive voltage to the reel motor 60 to thus increase the angular speed of the reel 12. Thus, for an empty reel condition, the tension arm 30 will move to the extreme top of the slot 32.

Thus, it should now be appreciated that in typical tape transport systems, the tape reservoir or tension arm performs two functions which have been represented in FIGS. 2C and 2D. That is, the first function, represented in FIG. 2C, is to provide tape from the reservoir during periods of drive capstan acceleration while the reel 12 is not yet rotating at a speed sufficient to pay out tape at the rate at which it is being pulled by the drive capstan. The second function as represented in FIG. 2D is to increase the angular speed of the reel 12 at a rate proportional to the decrease in tape radius.

Figure 4:
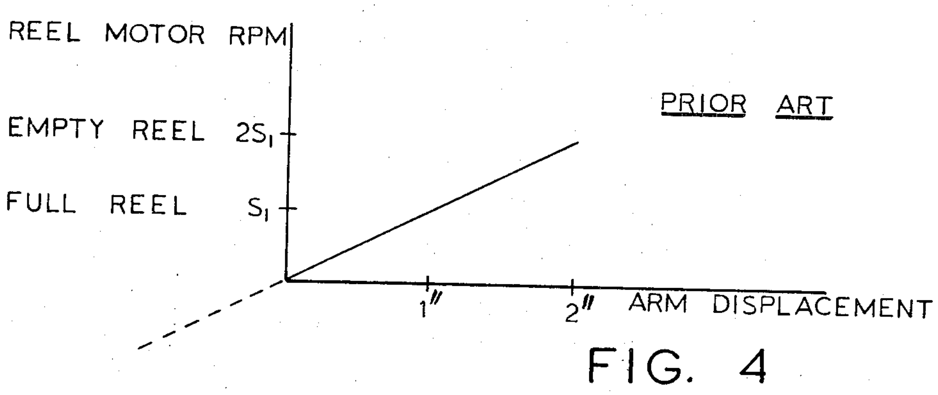
FIG. 4 is a diagram illustrating the linear relationship between reel motor speed and tension arm displacement in accordance with the prior art.

It is conventional practice in the prior art to linearly relate positional changes of the tension arm 30 to speed changes of the motor 60. That is, assuming for example that the length of the slot 32 is 4 inches, thus meaning that the tension arm 30 can deviate upwardly 2 inches from the center position, one half of that range or 1 inch is normally dedicated to the function represented in FIG. 2C of increasing the reel speed from rest to $S_1$. The second inch of that 2 inch range is normally dedicated to then increasing reel speed from the full reel speed $S_1$ to the empty reel speed $2S_1$. These relationships are represented in FIG. 4.

Figure 5:
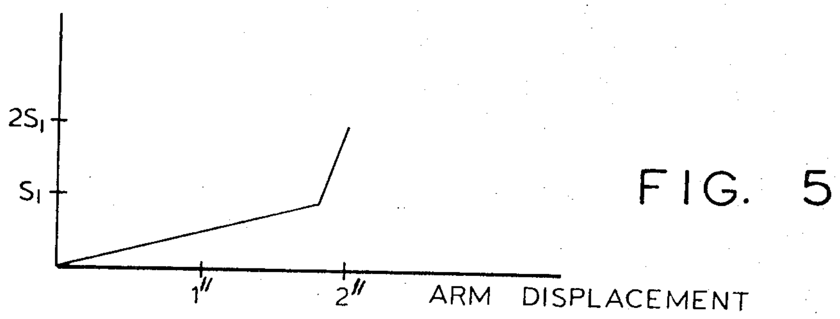
FIG. 5 is a diagram illustrating reel motor speed as a function of tension arm displacement of a system in accordance with the present invention.

In accordance with the present invention, it is recognized that the positional deviation of tension arm 30 need not be linearly related to the speed of the reel motor 60. Rather, a significantly larger portion of the range of positional change of the tension arm can be dedicated to the rapid speed change required of the reel from rest to speed $S_1$ in response to a changing capstan speed and a significantly smaller portion of the range of tension arm positional change can be dedicated to the gradual reel speed change required for compensating for tape radius changes. More particularly, as represented in FIG. 5, approximately 95 percent or 1.9 inches of a 2 inch range of tension arm displacement can be dedicated to accelerating the reel 12 from rest to speed $S_1$. By substantially increasing the arm displacement during which the reel 12 is permitted to come up to speed $S_1$, the motor current requirements are considerably reduced. Alternatively, in lieu of reducing the motor current requirements, the total range of available arm displacement can be reduced.

Figure 7:
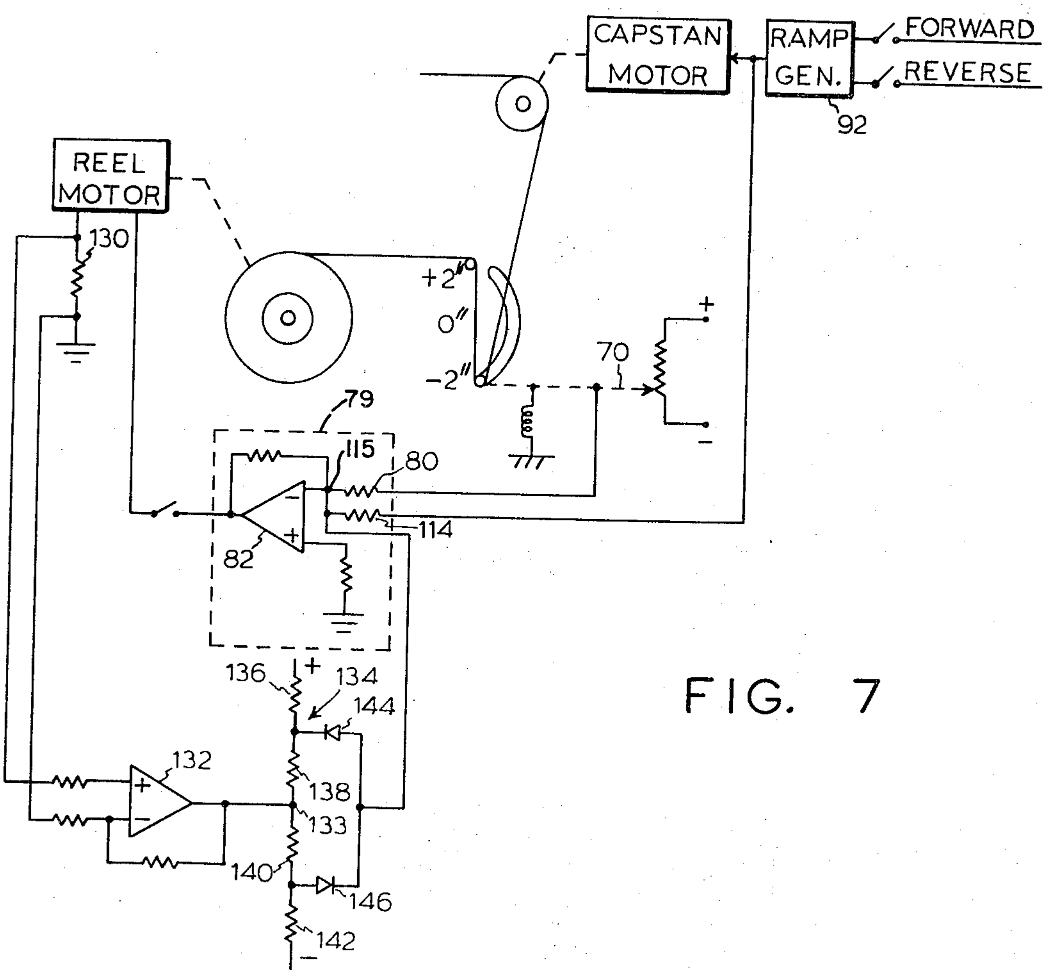
FIG. 7 is a schematic diagram of a reel servo system in accordance with the present invention.

In accordance with the preferred embodiment of the invention, in order to define a first function relating reel motor speed to tension arm displacement for a change in capstan speed and a second different function relating reel motor speed to tension arm displacement for a constant capstan speed but changing tape radius, a signal indicative of capstan speed is applied to the operational amplifier network 79. A signal indicative of capstan speed can be derived in several different manners. For example, a capstan tachometer could be provided for generating a voltage 110 as shown in the bottom line of FIG. 3. Preferably however, the output of ramp generator 92 applied to the input of the operational amplifier network 79 as through a resistor 114, to a summing junction 115 at the input of amplifier 82, as shown in FIG. 7.

Figure 6:
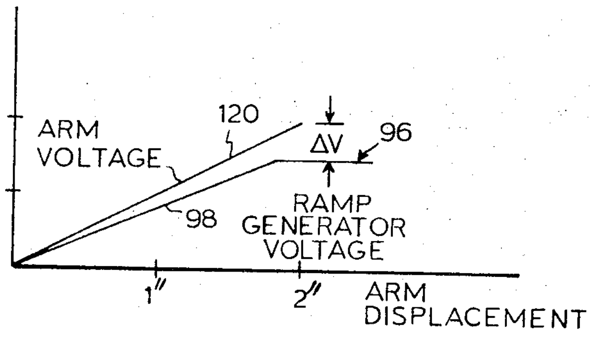
FIG. 6 is a diagram illustrating the relationship between tension arm voltage and capstan voltage as a function of tension arm displacement in accordance with the present invention.

The voltage provided by the ramp generator 92 through the resistor 114 is summed (actually algebraically differenced by proper selection of polarities) with the voltage provided by the wiper contact 70 at the first input terminal of amplifier 82. Thus, the difference between the arm voltage, represented by waveform 120 in FIG. 6 and the ramp generator voltage, represented by waveform 96 in FIG. 6, constitutes the input signal to the amplifier 82. Assume that the gain of the amplifier 82 is selected so that the voltage Δ V/2 illustrated in FIG. 6 is required to provide a motor current sufficient to drive the reel at the maximum angular speed required, i.e., $2S_1$ for the empty reel condition. Half that voltage, i.e., Δ V/2 is required to drive the reel motor at the full reel speed $S_1$. By properly scaling the amplifier input resistors 80 and 114, the difference between the tension arm voltage 120 and the ramp generator voltage 96 will not increase to Δ V/2 until the arm has been displaced a major portion of its range, i.e., 1.95 inches of the 2.0 available inches.

Thus, it can be seen that by increasing the gain of amplifier 82 as compared to the prior art configuration of FIG. 2, and by applying, as an additional input signal thereto, a representation of the capstan speed, the relationship between the tension arm displacement and reel motor speed can be varied so that 50 percent of the reel maximum speed is reached at 95 percent of tension arm displacement. By enabling this required rapid reel speed change from rest to $S_1$ to take place over a greater arm displacement, the motor current requirements are reduced.

The use of a high gain amplifier 82 in accordance with the invention raises the problem of amplifier saturation. In order to avoid saturation and to limit the peak motor drive current to that which is required to achieve the necessary acceleration, current limiting means are provided in the form of a feedback loop around amplifier 82. More particularly, a resistor 130 is provided in series with the motor drive current path and the current magnitude and polarity is monitored by monitoring the voltage developed across the resistor 130. That is, the resistor terminals are respectively coupled to first and second inputs of an operational amplifier 132. The output of amplifier 132 is coupled to a center junction 133 of a voltage divider 134 comprised of a series string of resistors 136, 138, 140 and 142. Resistors 136 and 142 may each have a value R and each of resistors 138 and 140 a value R/2. A source of potential, e.g., + 5 volts to − 5 volts, is connected across the voltage divider. Diode 144 couples the junction between resistors 136 and 138 to the summing junction 115 and oppositely poled diode 146 couples the junction between resistors 140 and 142 to the summing junction 115. Normally, both diodes 144 and 146 are back biased so that the amplifier 132 contributes nothing to the summing junction 115. However, as the motor drive current magnitude increases, the output of amplifier 132 will increase, in either a positive or negative direction dependent upon the direction of reel motion. As the amplifier output increases above a positive threshold, e.g., +2.5 volts, it will forward bias diode 146 and contribute a positive input to the junction 115 which acts in a direction to oppose the increase in drive current magnitude. On the other hand, as the output of amplifier 132, increases in a negative direction beyond a certain threshold, diode 144 will be forward biased to contribute a negative input to the junction 115 to oppose any further increase in drive current magnitude.

From the foregoing, it should now be apparent that an improved reel servo system has been disclosed herein for controlling reel torque in a manner to maintain steady tape tension in spite of rapid changes in linear tape speed and slowly occurring changes in reel tape radius. In accordance with the invention, reel control is achieved in a manner which permits a reduction in torque requirements as contrasted with the prior art, by enabling rapid changes in reel speed to occur over a large portion of the range of tension arm movement and slow changes in reel speed to occur over a small portion of the range of arm movement.

What is claimed is:

1. A system useful for controlling the speed of a motor coupled to a reel of a tape transport apparatus which includes a capstan for pulling tape from or supplying tape to said reel and a reservoir means between said capstan and reel for storing variable lengths of tape, said system comprising:

means providing a first electrical signal indicative of the length of tape stored in said reservoir;

means providing a second electrical signal related to the speed of said capstan; and circuit means responsive to said first and second electrical signals for supplying a speed controlling signal to said motor.

2. The system of claim 1 wherein said reservoir means includes a tension arm mounted for movement toward and away from said capstan, said tension arm resiliently bearing against said tape between said reel and said capstan to form a loop therein; and wherein said means providing a first electrical signal includes means responsive to the position of said tension arm.

3. In a tape transport apparatus including a reel and a capstan for pulling tape from or supplying tape to said reel, a servo system for controlling the speed of a drive motor coupled to said reel, said servo system comprising:

a tension arm mounted for movement along a fixed path toward and away from said capstan and adapted to bear against said tape between said reel and said capstan to form a loop therein;

means responsive to the position of said arm along said fixed path for producing a first electrical signal indicative thereof;

means producing a second electrical signal proportional to the speed of said capstan; and amplifier means responsive to the difference between said first and second signals for developing a drive current for controlling the torque of said drive motor.

4. The apparatus of claim 3 including spring means coupled to said tension arm acting in a direction to maximize the length of tape in said loop.

5. The apparatus of claim 4 wherein said drive current developed by said amplifier means when said capstan is at rest produces a torque in said drive motor acting oppositely to said spring means to substantially center said tension arm along said fixed path.

6. The apparatus of claim 5 wherein said first signal has a magnitude substantially proportional to the deviation of said tension arm from said center position and wherein said second signal is comprised of a ramp portion representing an interval of capstan acceleration and a level portion representing an interval of constant capstan speed and whereby deviations in said tension arm position during intervals of constant capstan speed will produce greater changes in motor drive current than corresponding deviations in tension arm position during intervals of capstan acceleration.

7. The apparatus of claim 6 wherein acceleration of said capstan from rest to said constant capstan speed produces movement of said tension arm in a direction to reduce the length of tape in said loop and wherein a decreasing radius of tape on said reel produces movement of said tension arm in a direction to reduce the length of tape in said loop.

8. The apparatus of claim 3 including means for limiting the magnitude of said drive current.

9. The system of claim 1 wherein said circuit means is responsive to a given deviation of tape length in said reservoir for producing a first change in said speed controlling signal for a constant capstan speed and a different change in said speed controlling signal for a changing capstan speed.

10. The system of claim 9 wherein said circuit means includes an amplifier having an input terminal;

summing circuit means including a summing junction output terminal and first and second summing input terminals respectively connected to said means providing said first signal and said means providing said second signal; and means connecting said summing junction output terminal to said amplifier input terminal.

* * * * *